United States Patent
Vaughan

[11] Patent Number: 5,976,491
[45] Date of Patent: Nov. 2, 1999

[54] SYNTHESIS OF AND COMPOSITION OF ECR-40, LARGE PORE ALUMINOPHOSPHATE

[75] Inventor: David E. W. Vaughan, Flemington, N.J.

[73] Assignee: Exxon Research and Engineering Co., Florham Park, N.J.

[21] Appl. No.: 09/169,653

[22] Filed: Oct. 9, 1998

[51] Int. Cl.[6] .......................... C01B 37/04; C01B 37/06; C01B 37/08
[52] U.S. Cl. .......................... 423/718; 423/705; 423/706; 423/305; 423/306; 423/DIG. 30; 502/208; 502/209; 502/213; 502/214
[58] Field of Search ..................... 423/305, 306, 423/706, 705, 718, DIG. 30; 502/208, 209, 213, 214

[56] References Cited

U.S. PATENT DOCUMENTS

| | | | |
|---|---|---|---|
| 3,699,139 | 10/1972 | Rubin et al. | 556/173 |
| 3,950,496 | 4/1976 | Ciric | 423/718 |
| 4,310,440 | 1/1982 | Wilson et al. | 423/305 |
| 4,440,871 | 4/1984 | Lok et al. | 502/214 |
| 4,778,780 | 10/1988 | Valyocsik et al. | 502/214 |
| 4,793,984 | 12/1988 | Lok et al. | 423/704 |
| 4,963,337 | 10/1990 | Zones | 423/277 |
| 5,102,641 | 4/1992 | Casci et al. | 423/708 |
| 5,350,570 | 9/1994 | Schmitt | 423/705 |
| 5,512,267 | 4/1996 | Davis et al. | |

Primary Examiner—Mark L. Bell
Assistant Examiner—David Sample
Attorney, Agent, or Firm—Ronald D. Hantman

[57] ABSTRACT

The present invention is a large-pore aluminophosphate or substituted aluminophosphate comprising a composition $$aR:(M_xAl_yP_z)O_2$$

wherein R represents an organic templating agent, and a=0 to 0.4, X=0 to 0.4, y=0.35 to 0.5, and Z=0.25 to 0.5 and characterized by the diffraction pattern of Table 1 and M may be Si, Ga, Ge, Co, Ni, Zn, Fe, V, Ti and mixtures thereof.

10 Claims, No Drawings

SYNTHESIS OF AND COMPOSITION OF ECR-40, LARGE PORE ALUMINOPHOSPHATE

FIELD OF THE INVENTION

This invention relates to a new species of crystalline microporous metal aluminophosphate molecular sieves, to its method of preparation and to its use as an adsorbent and catalyst. The species is identified as ECR-40 and is prepared hydrothermally from gels containing reactive sources of phosphorus, aluminum, organic templating agents and a metal (preferably silicon) and water.

BACKGROUND OF THE INVENTION

Zeolites are crystalline aluminosilicate molecular sieves which have a microporous three-dimensional framework structure. In general, the crystalline zeolites are formed from corner-sharing $AlO_2$ and $SiO_2$ tetrahedra and are characterized by having pore openings of uniform dimensions, having a significant ion-exchange capacity and being capable of reversibly desorbing an adsorbed phase which is dispersed throughout the internal voids of the crystal without significantly displacing any atoms which make up the permanent crystal structure.

Zeolites can be represented on an anhydrous basis, by the empirical formula $$M_{2/n}O{:}Al_2O_3{:}XSiO_2$$

where M is a cation having the valence n, X is generally equal to or greater than 2. In naturally occurring zeolites, M can be Li, Na, Ca, K, Mg and Ba. The M cations are loosely bound to the structure and frequently can be completely or partially replaced with other cations by conventional ion exchange techniques. Currently over 100 species of both naturally occurring and synthetic zeoetes are known. One notes that although most commercial patents refer to these phosphate compositions as "molecular sieves" rather than zeolites, scientific groups include them in the "zeolites" (Barrer, Pure and Applied Chem., v. 51, 1091 (1979); Coombs et. al., Canad. Mineral, v. 35, p. 1571 (1997)).

Other crystalline microporous compositions are known which have been called zeolites or molecular sieves and which exhibit the ion-exchange and/or adsorption characteristics of the zeolites. These include aluminophosphates and substituted aluminophosphates as disclosed in U.S. Pat. Nos. 4,310,440 and 4,440,871. U.S. Pat. No. 4,440,871 discloses a class of silica aluminophosphates which are identified by the acronym SAPO and which have different structures as identified by their x-ray diffraction pattern. The structures are identified by a numerical number after ALPO, SAPO, MEAPO, etc. (Flanigen et al, Proc. 7th Int. Zeolite Conf., p. 103 (1986) and may include Al and P substitutions by Si, Be, Mg, Ge, Zn, Fe, Co, Ni, etc. The present invention is the first synthesis of a phosphate (ALPO/SAPO, etc.) having the characteristic X-ray diffraction pattern shown in Table 1.

SUMMARY OF THE INVENTION

The present invention is a large-pore aluminophosphate or substituted aluminophosphate comprising a composition $$aR{:}(M_xAl_yP_z)O_2$$

wherein R represents an organic templating agent, and a=0 to 0.4, X=0 to 0.4, y=0.35 to 0.5, and Z=0.25 to 0.5 and characterized by the diffraction pattern of Table 1 and M may be Si, Ga, Ge, Co, Ni, Zn, Fe, V, Ti and mixtures thereof.

DESCRIPTION OF THE PREFERRED EMBODIMENT

ECR-40 is made in the presence of relatively simple methyltriethanol ammonium or bis-(dihydroxyethyl) dimethyl ammonium templates. Unlike many of these substituted phosphates, such as the faujasite form (ALPO/SAPO-37), ECR-40 has high thermal stability (and stability in some steam) and adsorption capacity for large molecules, including misitylene, offering uses in FCC and hydrocracking in addition to hydroisomerization and aromatization, wherein in the last case the ALPO form provides a non-acidic exponent for metal catalysis. The SAPO form allows the preparation of low acidity catalysts to be synthesized directly without the need for post synthesis processing, usually needed to produce low acidity catalysts from aluminosilicates. The X-ray diffraction pattern shown for ECR-40 is very similar to that previously reported for the aluminosilicate zeolite ZSM-18 (U.S. Pat. No. 3,950,496; Science, v. 247, p. 1319 (1990)) and may be a new composition for the structure type MEI (Atlas of Zeolite Structure Types, Elsevier Press (1996), 4th Edn.) However, ECR-40 indexes best on an orthorhombic rather than a hexagonal unit cell characteristic of ZSM-18.

Low acidity zeolites are in demand for such processes as hydrocracking and hydroisomerization. Most aluminosilicate zeolites, such as FAU and beta, require post synthesis modification to lower their acidities to acceptable values. In the case of SAPO's, the acidity can be closely controlled by the amount of silica dopant included in the ALPO structure. Unfortunately most large pore ALPO's and SAPO's have mediocre thermal and hydrothermal stability. ECR-40 has neither of these problems in that it survives template burn-off at 630° C. without loss in crystallinity and has survived for several hours in water saturated air flow at 600° C. without crystallinity or sorption capacity loss, as measured by hexane, DBM (dimethylbutane), 0-xylene and misitylene.

Accordingly, the present invention includes a large-pore aluminophosphate or substituted aluminophosphate comprising $$aR{:}(M_xAl_yP_z)O_2$$

wherein R represents an organic templating agent, and M=0 to 0.4, X=0 to 0.4, y=0.35 to 0.5, and Z=0.25 to 0.5 and characterized by the diffraction pattern of FIG. 1, having the essential X-ray diffraction lines (Cu Kα) (or alpha) shown in Table 1.

In addition, the present invention includes a process for preparing an aluminophosphate or substituted aluminophosphate comprising forming a reaction mixture of $SiO_2$, $Al_2O_3$ and $P_2O_5$ and an organic templating agent, said reaction mixture having a composition expressed in terms of molar oxide ratios of 1.5 to 3.0 $ROH{:}Al_2O_3{:}0.7$ to 1.25 $P_2O_5{:}0$ to 0.4 $MO_x{:}40$–80 $H_2O$ where R is the templating agent, and M=Si Ga, Ge, Co, Ni, Zn, Fe, Ti, V and mixtures thereof Said template is preferably methyltriethanol ammonium or bis (2-hydroxyethyl) dimethyl ammonium. The said ECR-40 has a characteristic X-ray diffraction pattern, the essential lines of which are given in Table 1 for Cu Kα (alpha) radiation. The line intensities are referenced to the strongest line, in this case the first line at about 11.35 Å 2θ. Minor variations occur as a function of specific composition (P/Al/M ratios) and the specific template and its loading (intercalation) in the structure. In this case the intensities are bracketed as follows, using the strongest line =100:
very, very strong (vvs) =100–70
very strong (vs) =70–50
strong (s) =50–30
medium (m) =30–10
weak (w) =<10

TABLE 1

| Interplanar Spacing | Line Intensity |
|---|---|
| 11.35 ± 0.20 | vvs. |
| 6.57 ± 0.12 | m. |
| 5.08 ± 0.10 | w. |
| 4.64 ± 0.10 | mw. |
| 4.30 ± 0.08 | m. |
| 4.15 ± 0.08 | vs. |
| 4.02 ± 0.08 | w. |
| 3.79 ± 0.06 | s. |
| 3.35 ± 0.06 | w. |
| 3.28 ± 0.06 | m. |
| 3.09 ± 0.06 | m. |
| 2.935 ± 0.03 | mw. |
| 2.480 ± 0.03 | mw. |
| 1.895 ± 0.03 | w. |

DESCRIPTION OF THE PREFERRED EMBODIMENT

As stated above, the present invention is a substituted aluminophosphate composition and a process for making it.

EXAMPLES

Example 1

To make a reactant composition of formula:

$$2ROH:0.2\ SiO_2:0.95\ Al_2O_3:0.95P_2O_5:50\ H_2O$$

where R is the template, 12.9 gm of Catapal A alumina were mixed with 120.8 gm 25% wt. aqueous solution of bis-(2-hydroxyethyl) dimethyl ammonium hydroxide (RSA Inc.) in a blender for 10 minutes, followed by 3 gm DuPont Ludox AS-40 colloidal silica, followed by 24.8 gm phosphoric acid (85%). Bending continued for 10 minutes. 52 gm aliquots were then measured into 125 ml. Parr Teflon lined autoclaves and reacted at 162° C. A sample reacted for 57 days. The product was diluted, homogenized and centrifuged, decanted, washed and again centrifuged. The solid product was a single phase having the characteristic X-ray diffraction pattern having the essential lines shown in Table 1 and indexed as having an orthorhombic unit cell of dimensions a=16.06 Å, b=11.34 Å and c=6.57 Å, closely similar to that for the aluminosilicate composition ZSM-18. In this preparation the product is in the form of prizmatic crystals having dimensions between 0.1μ×1μ cross section and 0.5μ×4μ long. This phosphate composition is designated as ECR-40. Chemical analysis by ICPAES gave a composition: 14.95% Al; 12.97% P; 4.36% Si, representing an ECR-40 stoichiometry of 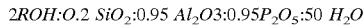 $(Al_{0.49}, Si_{0.14}, P_{0.37})\ O_2$.

Example 2

The reactant formulation in Example 1 was reformulated using a 50 wt. % solution of the bis-(2-hydroxyethyl) dimethyl ammonium hydroxide (RSA Inc.) template and reacted at 160° C. for 24 days. The product had the characteristic X-ray diffraction pattern shown in Table 1 and FIG. 1. Thermogravimetric analysis in an air flow showed a 3 step weight loss, including a 10% loss related to template burn-off at about 300° and 450° C. After calcining a sample of this material in air at 630° C. for 16 hours, followed by equilibration with water at 88% RH, the sample gained 23 wt. %. A n-hexane isotherm run at 21° C. on the same calcined sample gave a maximum capacity of 16% wt. A single point static sorption over air saturated ortho-xylene gave a sorption capacity of 17.5% wt. and a similar experiment with 2,2-dimethylbutane (DMB) a capacity of 17.4% wt., confirming the large pore nature of the channel system and its high pore volume. The morphology of this product is similar to that observed in Example 1, with an aspect ratio greater than about 5. Chemical analysis by ICPAES gave 15.99% Al; 13.54% P and 4.63% Si; representing a stoichiometry of $(Al_{0.49};\ Si_{0.28};\ P_{0.33})\ O_2$.

Example 3

This example demonstrates that ECR-40 can be synthesized from a pre-made dried SAPO gel. The SAPO gel was made by reacting a composition of:

$$0.2\ SiO_2:0.95\ Al_2O_3:0.95P_2O_5$$

by vigorously mixing together 675 gm Al(NO₃)₃.9H₂O dissolved in 1200 gm water and 207 gm 85% phosphoric acid, followed by 57 gm Na₂SiO₃.9H₂O dissolved in 250 gm water. Ammonium hydroxide was slowly added until gellation occurred at pH=7.4. The gel was filtered and washed, dried 60 hours at 110° C., then ground to a fine powder. The chemical analysis of this product gave a composition ratio of: 0.13 SiO₂:Al₂O₃:P₂O₅.. 10 gm of this dried gel was reacted with 60 gm 22.5% wt. of aqueous methyltriethanol hydroxide in a 125 ml Parr Teflon lined autoclave at 170° C. for 43 days, at which time the bomb was quenched. The microcrystalline product, after separation and drying gave the specific characteristic X-ray diffraction pattern shown in Table 2 and FIG. 1. The data in Table 2 has been tentatively indexed on an orthorhombic unit cell having approximate axes: a=16.5 Å; b =11.4 Å; C=6.58 Å.

TABLE 2

| Observed Spacing | | Proposed Indexing | | | Relative Intensity |
|---|---|---|---|---|---|
| 2-Theta | d(A) | h | k | l | I/Io |
| 7.782 | 11.3506 | 1 | 0 | 0 | 100.0 |
| 9.438 | 9.3630 | 1 | 0 | 1 | 0.3 |
| 11.018 | 8.0237 | 0 | 0 | 2 | 4.1 |
| 13.474 | 6.5663 | 0 | 1 | 0 | 13.0 |
| 15.578 | 5.6838 | 2 | 0 | 0 | 2.2 |
| 17.440 | 5.0809 | 0 | 1 | 2 | 6.9 |
| 18.315 | 4.8401 | 1 | 0 | 3 | 1.4 |
| 19.115 | 4.6392 | 2 | 0 | 2 | 9.7 |
| 20.656 | 4.2965 | 2 | 1 | 0 | 13.1 |
| 21.389 | 4.1508 | 0 | 1 | 3 | 55.6 |
| 22.102 | 4.0185 | 0 | 0 | 4 | 7.5 |
| 22.794 | 3.8980 | 2 | 0 | 3 | 1.4 |
| 23.464 | 3.7882 | 3 | 0 | 0 | 44.4 |
| 24.113 | 3.6878 | 3 | 0 | 1 | 1.7 |
| 25.974 | 3.4276 | 3 | 0 | 2 | 2.2 |
| 26.565 | 3.3526 | 2 | 1 | 3 | 7.5 |
| 27.163 | 3.2802 | 2 | 0 | 4 | 12.8 |
| 27.717 | 3.2159 | 3 | 1 | 1 | 3.0 |
| 28.831 | 3.0941 | 3 | 0 | 3 | 13.4 |
| 29.376 | 3.0379 | 3 | 1 | 2 | 3.3 |
| 30.438 | 2.9343 | 2 | 1 | 4 | 10.4 |
| 30.965 | 2.8855 | 0 | 1 | 5 | 2.4 |
| 31.425 | 2.8444 | 2 | 2 | 0 | 0.6 |
| 31.961 | 2.7979 | 1 | 1 | 5 | 5.0 |

TABLE 2-continued

| Observed Spacing | | Proposed Indexing | | | Relative Intensity |
|---|---|---|---|---|---|
| 2-Theta | d(A) | h | k | l | I/Io |
| 32.459 | 2.7561 | 3 | 0 | 4 | 1.2 |
| 32.929 | 2.7178 | 1 | 2 | 3 | 2.7 |
| 33.425 | 2.6786 | 0 | 0 | 6 | 2.8 |
| 34.366 | 2.6074 | 1 | 0 | 6 | 1.3 |
| 34.830 | 2.5737 | 2 | 1 | 5 | 1.6 |
| 36.180 | 2.4807 | 4 | 1 | 2 | 9.7 |
| 37.919 | 2.3708 | 3 | 2 | 2 | 2.6 |
| 38.345 | 2.3455 | 4 | 1 | 3 | 2.3 |
| 39.611 | 2.2734 | 5 | 0 | 0 | 1.6 |
| 40.005 | 2.2519 | 3 | 2 | 3 | 3.2 |
| 41.225 | 2.1880 | 5 | 0 | 2 | 1.1 |
| 41.636 | 2.1674 | 0 | 1 | 7 | 1.0 |
| 42.024 | 2.1483 | 1 | 3 | 0 | 1.4 |
| 42.438 | 2.1282 | 4 | 0 | 5 | 0.6 |
| 42.798 | 2.1112 | 3 | 2 | 4 | 0.6 |
| 43.596 | 2.0744 | 5 | 1 | 2 | 0.9 |
| 44.328 | 2.0418 | 1 | 2 | 6 | 3.6 |
| 44.693 | 2.0260 | 4 | 1 | 5 | 2.0 |
| 45.787 | 1.9801 | 5 | 0 | 4 | 1.7 |
| 46.176 | 1.9643 | 3 | 2 | 5 | 0.9 |
| 47.980 | 1.8946 | 5 | 1 | 4 | 5.1 |
| 48.734 | 1.8670 | 4 | 1 | 6 | 2.1 |
| 49.008 | 1.8572 | 5 | 2 | 1 | 2.4 |

What is claimed is:

1. A large-pore aluminophosphate or substituted aluminophosphate comprising a composition $$aR{:}(M_xAl_yP_z)O_2$$

wherein R represents an organic templating agent, and a=0 to 0.4, X=0 to 0.4, y=0.35 to 0.5, and Z=0.25 to 0.5 and characterized by the diffraction pattern of Table 1 and M is Si, Ga, Ge, Co, Ni, Zn, Fe, V, Ti or mixtures thereof.

2. The composition of claim 1 wherein R is methyltriethanol ammonium.

3. The composition of claim 1 wherein R is a tris-quaternary ammonium cation.

4. The composition of claim 1 wherein R is bis-(2-hydroxyethyl) dimethyl ammonium cation.

5. A process for preparing the composition of claim 1 comprising crystallizing a reaction mixture including sources of oxides of M, $Al_2O_3$ and $P_2O_5$ and an organic templating agent, said reaction mixture having a composition expressed in terms of molar oxide ratios of 1.5 to 3.0 ROH:$Al_2O_3$:0.7 to 1.25 $P_2O_5$:0 to 0.4 $MO_x$:40–80 $H_2O$ where R is the templating agent.

6. A process of claim 5 wherein M is silicon.

7. The process of claim 5 wherein R is a tris-quaternary ammonium.

8. The process of claim 5 wherein R is bis-(2-hydroxyethyl) dimethyl ammonium hydroxide.

9. The process of claim 5 wherein R is methyltriethanol ammonium.

10. The process of claim 5 wherein the sources of oxides are derived from a premade, pre-dried, amorphous gel.

* * * * *